Oct. 24, 1961     F. W. ROSS     3,005,311
GAS TURBINE ENGINE WITH COMBUSTION INSIDE COMPRESSOR
Filed Aug. 8, 1957     3 Sheets-Sheet 2
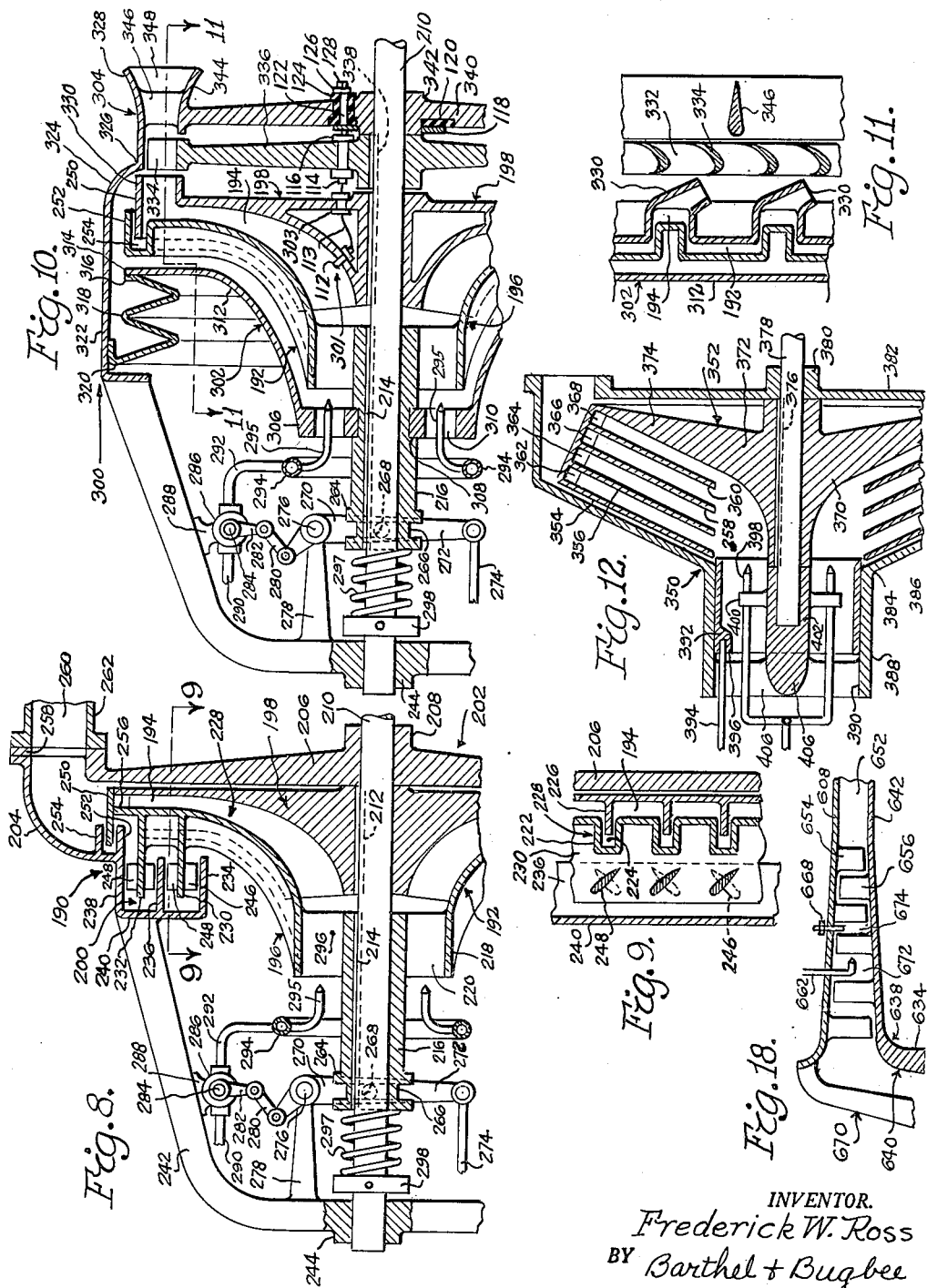
INVENTOR.
Frederick W. Ross
BY Barthel + Bugbee
Attys

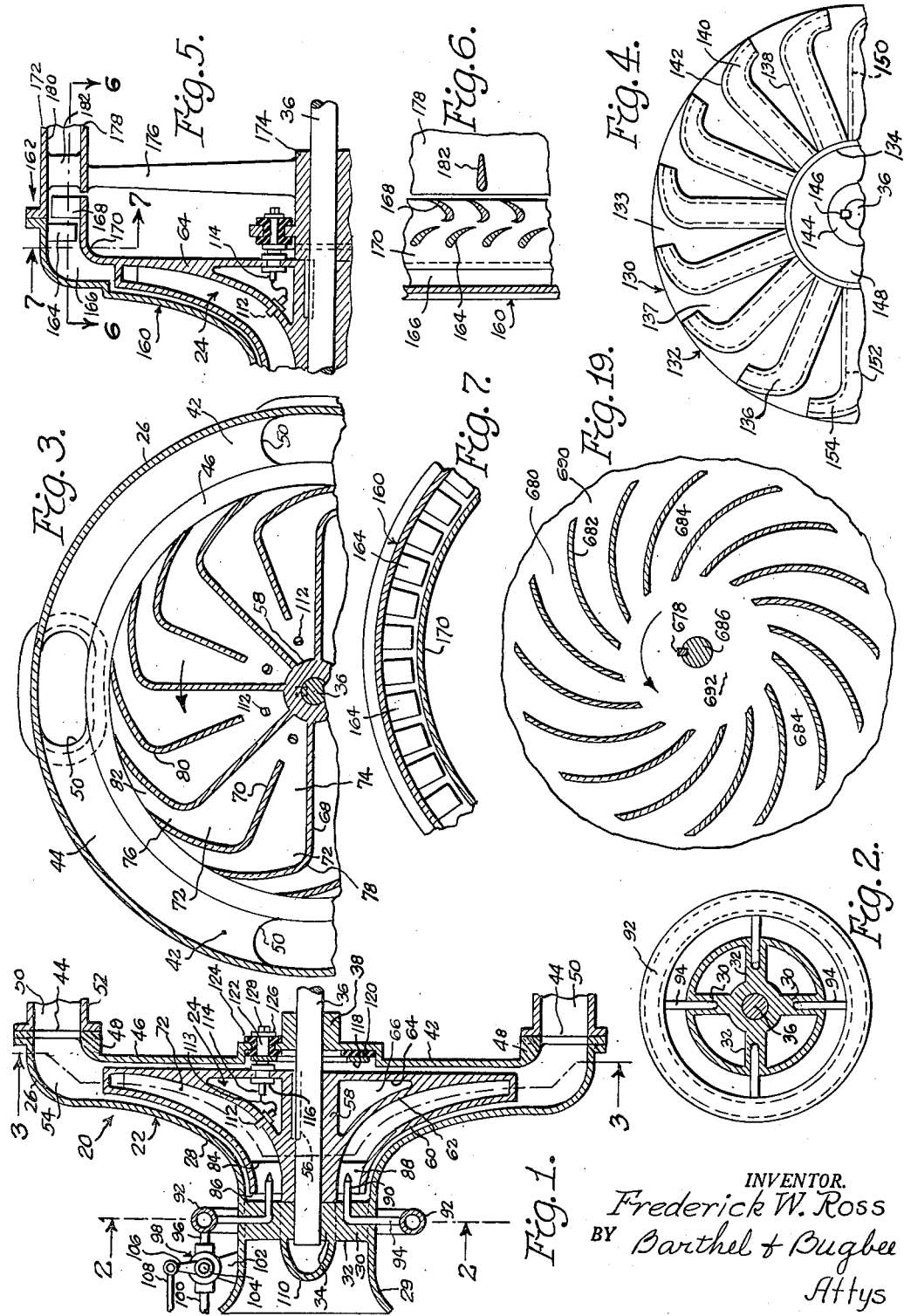

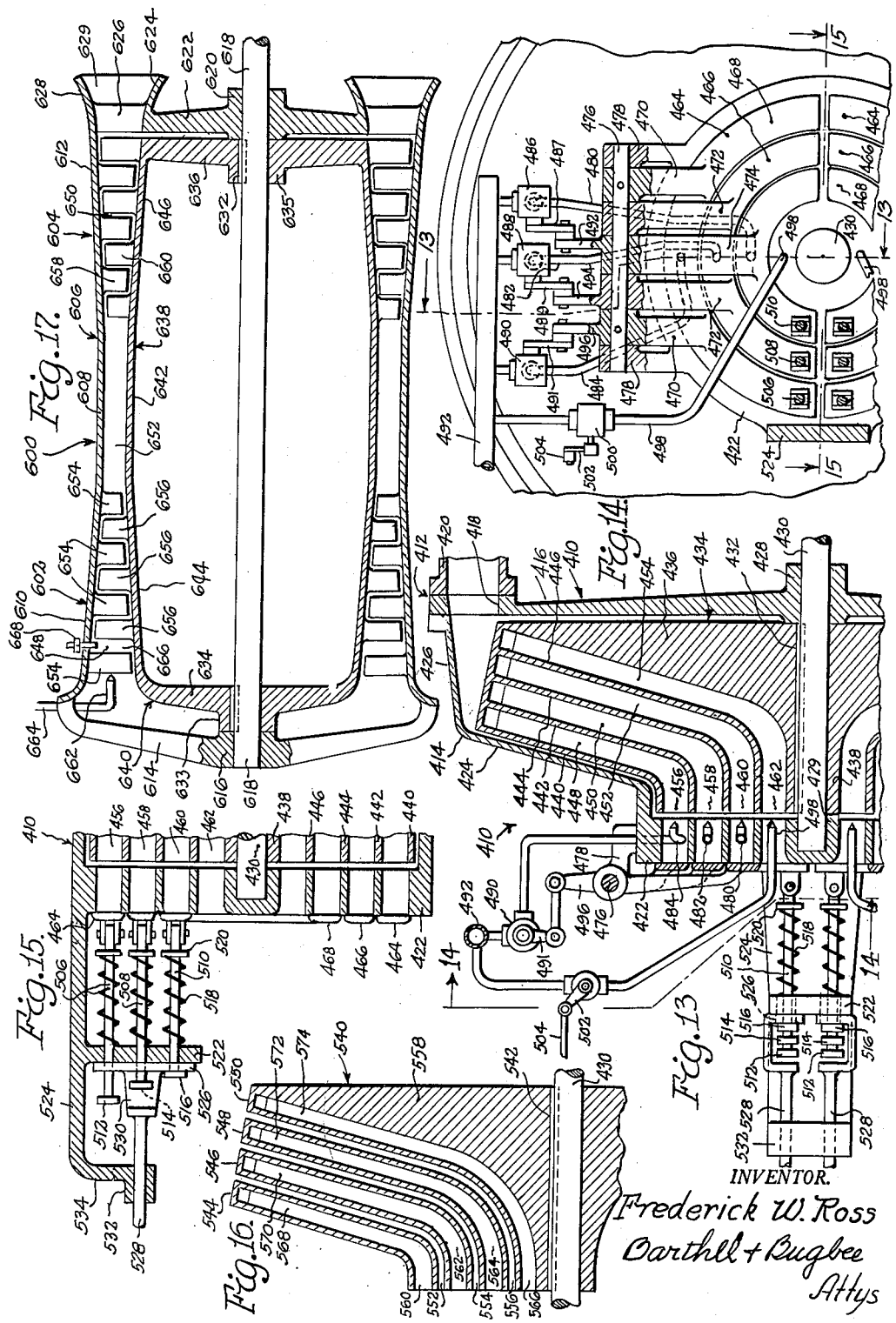

United States Patent Office

3,005,311
Patented Oct. 24, 1961

---

3,005,311
GAS TURBINE ENGINE WITH COMBUSTION
INSIDE COMPRESSOR
Frederick W. Ross, 719 N. Melborn Ave.,
Dearborn, Mich.
Filed Aug. 8, 1957, Ser. No. 677,034
9 Claims. (Cl. 60—39.35)

This invention relates to gas turbine engines and, in particular, to design structures therefor which are lighter in weight, less expensive to produce, and more efficient in operation.

Hitherto, gas turbine engines have consisted of at least three separate units, namely a compressor unit, a combustor unit, and a driving turbine unit. Often these units have additionally comprised two or more separate components each, such as two separate compressor stages, several parallel combustor units and one or more driving turbine wheels. In such engines, of course, the units are properly matched so that the entire combination operates as a single engine unit.

In such prior gas turbine engines, moreover, two or more separate rotors and separate combustors are needed. A long drive shaft and extra bearings and supporting structure are also required so that the turbine rotor can drive the compressor rotor. The separate compressor and turbine units must also be interconnected through the combustion units by extra ducting. In more complicated units, additional shafting, structure and ducting are necessary.

In addition, heretofore the percentage of full power drawn from the conventional gas turbine engine comprising a single unit compressor and one or two driving turbine wheels has been controlled by reducing the rate of fuel fed into the engine while either maintaining gaseous products of combustion at a constant temperature or the compressor shaft rotational speed constant. The latter effect can only be practically realized over a narrow range of part power operation of the engine. Accordingly, there must be a reduction in engine shaft speed and consequently in compressor rotational speed. As the compression ratio is dependent on compressor speed, accordingly the compression ratio decreases as the amount of power drawn from the engine decreases, in consequence of which the proportionate amount of fuel burned at part power increases as the fraction of power drawn from the engine is decreased.

The present invention makes it possible to combine all three of the separate units, that is, the compressor, combustor and compressor driving turbine units into one compact rotor. Thus, one prior rotor unit is eliminated, the long shaft with several bearings is replaced by a shaft of approximately half the length with approximately half the bearings. The separate combustion chamber is eliminated, as also is the interconnecting ducting, so that the air and gases are required to travel through much less ducting and through less devious passageways.

In addition, the fuel is injected at a point where the cooling effect of its evaporation, as it intermixes with the air, is such that it will increase the engine efficiency rather than decrease it as is the case in conventional designs where the fuel is injected after the air has been compressed, and where this cooling caused by evaporation must be counteracted by burning additional fuel to heat the resultant combustion gases and intermixed air to the desired temperature and pressure.

Accordingly, one object of the present invention is to provide a gas turbine engine wherein compression, fuel injection and combustion of the fuel-and-air mixture take place within a single rotor structure, the products of combustion either directly imparting the entire thrust to the rotor shaft as a whole, or feeding into a turbine stage which imparts a part of the thrust to the rotor shaft.

Another object is to provide a turbine engine as set forth in the preceding object wherein the outer ends of the rotor channels or vanes are bent tangentially so as to cause the gases to be deflected tangentially and thus enhance the thrust imparted to the rotor shaft.

Another object is to provide a gas turbine engine, as set forth in the preceding objects, wherein the rotor construction is modified so as to provide tubular rotor vanes with tangentially-directed outer ends, preferably slightly constricted to increase the compression ratio, the tubular vanes being thus more easily cooled than where the vanes and vane channels directly adjoin one another.

Another object is to provide a gas turbine engine of the foregoing character wherein the rotor is made up of interfitting rotor halves, one of which is movable axially relatively to the other rotor half so as to widen or narrow the blade or vane channels and thereby increase or decrease the power imparted to the rotor shaft.

Another object is to provide a gas turbine engine of the foregoing character, as set forth in the object immediately preceding, wherein the peripheral outlets of the blade channels are inclined not only tangentially but axially to impart added thrust to the rotor shaft and at the same time direct the emerging gases most efficiently into the inclined vanes of an additional axial-flow turbine stage for increasing the thrust imparted to the rotor shaft and further utilizing, for power purposes, the exhaust gases from the engine.

Another object is to provide a gas turbine engine of the foregoing character wherein multiple partitions are provided to separate each blade channel into multiple blade channels disposed in succession in an axial direction, each subsidiary blade channel having its own tangentially-directed outlet.

Another object is to provide a gas turbine engine as set forth in the object immediately preceding, wherein means are provided for separately injecting fuel into each of the subsidiary blade channels of the rotor, means also being provided for cutting off the different subsidiary blade channels in sequence so as to increase or decrease the power generated by the combustion gases within the rotor and on emerging therefrom.

Another object is to provide a gas turbine engine as set forth in the two objects immediately preceding wherein the subsidiary rotor blade channels are tubular and separated axially from one another so as to provide enhanced cooling facilities for the tubular rotor vanes thus provided.

Another object is to provide a gas turbine engine of the foregoing character wherein the blade arrangement for the rotor or rotors is entirely axial, rather than partly or wholly radial, with compression taking place in the initial blade stages and combustion in the final blade stages, fuel injection and ignition being made intermediate the initial and final blade stages.

Other objects and advantages of the invention will become apparent during the course of the following description of the accompanying drawings, wherein:

FIGURE 1 is a central vertical longitudinal section through a gas turbine engine according to one form of the invention wherein compression, fuel injection and ignition and combustion take place within or immediately adjacent a single rotor structure;

FIGURE 2 is a cross-section through the fuel injection arrangement of FIGURE 1, taken along the line 2—2 therein;

FIGURE 3 is a fragmentary vertical cross-section through the rotor and exhaust manifold taken along the line 3—3 in FIGURE 1;

FIGURE 4 is a fragmentary front elevation of a modified rotor adapted to be optionally used in the engine of FIGURE 1;

FIGURE 5 is a fragmentary central vertical longitudinal section through a further modification of the engine of FIGURE 1, containing an additional axial-flow turbine rotor;

FIGURE 6 is a fragmentary developed horizontal section through the axial-flow guide and turbine blading and adjacent structure, taken along the line 6—6 in FIGURE 5;

FIGURE 7 is a fragmentary vertical section through the structure of FIGURE 6, taken along the line 6—6 in FIGURE 5;

FIGURE 8 is a fragmentary central vertical longitudinal section through a still further modification of the engine of FIGURE 1, containing a modified rotor having relatively-movable rotor halves for adjusting the cross-sectional area of the blade channels, the ignition arrangement being omitted to simplify the drawing;

FIGURE 9 is a fragmentary developed horizontal section taken along the line 9—9 in FIGURE 8;

FIGURE 10 is a fragmentary central vertical longitudinal section through a modification of the engine of FIGURE 8, using a different sealing arrangement between the rotor chamber and housing, and adding a supplementary axial-flow turbine rotor, the ignition arrangement being omitted to simplify the drawing;

FIGURE 11 is a fragmentary developed horizontal section taken along the line 11—11 in FIGURE 10;

FIGURE 12 is a fragmentary central vertical longitudinal section through an additional modification of the engine of FIGURE 1, employing a rotor with tandem multiple blade channels, served by a common fuel injector and cut-off valve, the ignition arrangement being omitted to simplify the drawing;

FIGURE 13 is a fragmentary central vertical longitudinal section of a modification of the engine of FIGURE 12, providing individual injectors and cut-off valves for the multiple tandem blade channels, the ignition arrangement being omitted to simplify the drawing;

FIGURE 14 is a fragmentary vertical section, mainly in front elevation, of the engine of FIGURE 13, taken along the line 14—14 therein;

FIGURE 15 is a fragmentary horizontal section taken along the line 15—15 in FIGURE 14;

FIGURE 16 is a fragmentary longitudinal section through a modified rotor with tandem multiple blade channels separated from one another by air spaces for cooling, adapted to be used in the engine of FIGURE 13, the ignition arrangement being omitted to simplify the drawing;

FIGURE 17 is a central vertical longitudinal section through another modification showing a wholly axial-flow gas turbine engine with fuel injection preceding the compressor blading and including sequential axial flow turbine blading on a common rotor shell;

FIGURE 18 (on sheet 2) is a modification of the axial flow engine of FIGURE 17, with fuel injection and ignition within the compressor blading; and FIGURE 19 (on sheet 1) is a section similar to FIGURE 3, but showing spiral blades rather than inverted L-shaped blades.

Referring to the drawings in detail, FIGURES 1 to 3 inclusive show a gas turbine engine, generally designated 20, according to one form of the invention, as contained in a housing structure, generally designated 22, and consisting generally of a radial flow combined compressor and combustor rotor, generally designated 24, discharging into an exhaust manifold 26 and thence into the atmosphere. The housing structure 22 has a roughly bell-shaped forward wall 28 with a bell-mouthed or flared entrance portion 29 containing diametral spokes or arms 30 (FIGURE 2) forming a supporting spider 32 for a central shaft bearing 34 rotatably supporting the forward end of a rotary engine shaft 36. The rearward end of the shaft 36 is rotatably supported in a central shaft bearing 38 carried by the approximately flat or disc-shaped rearward wall 42 of the housing structure 22, which joins the peripherally-flanged forward wall 28 in an annular axially offset rearward peripheral housing wall portion 44 connected to the central portion 46 thereof by an annular boss 48 and containing roughly oval elongated exhaust ports 50. Bolted or otherwise secured to the peripheral wall portion 44 at the ports 50 are correspondingly-shaped and flanged exhaust conduits 52 which discharge the exhaust gases from the annular exhaust chamber 54 disposed between the peripheral portions of the forward and rearward housing structure walls 28 and 42 respectively.

Keyed or otherwise drivingly secured as at 56 to the shaft 36 is the hub 58 of the rotor 24, the latter being also approximately bell-shaped to fit within the housing structure 22. The rotor 24 is hollow, having forward, intermediate and rearward walls 60, 62 and 64 respectively. The forward and intermediate walls 60 and 62 are approximately bell-shaped whereas the rearward wall 64 is substantially flat and perpendicular to the shaft 36 so as to provide an annular chamber 66 of roughly triangular cross-section on each side of the rotor hub 58. The axial spacing of the forward and intermediate rotor walls 60 and 62 and the provision of approximately L-shaped generally radial continuous partition-like blades 68 and approximately L-shaped generally radial interrupted partition-like blades 70 between each pair of continuous blades 68 (FIGURE 3) provides approximately elbow-shaped blade channels 72 with inner or radial portions 74 and relatively-bent outer or approximately tangential portions 76 joined to one another at the junctions or outer corners 78 and 80 of the blades 68 and 70. Each of the tangential portions 76 of the blade channels 72 terminates at its outer end in a discharge port or outlet 82 opening approximately tangentially into the annular peripheral exhaust chamber 54.

The forward central or inner ends 84 of the blades 68 and 70 terminate short of the forward end 86 of the rotor forward wall 60 so as to provide an annular fuel injection passageway 88 opening into the blade channels 72 at their inner ends or inlets 84. Disposed within the fuel injection passageway 88 are circumferentially-spaced fuel injection nozzles 90 disposed parallel to the axis of rotation of the shaft 36 and supported by the arms 30 of the spider 32 (FIGURE 2). The nozzles 90 are connected to an annular fuel manifold 92 by radial pipes 94 and the manifold 92 in turn is connected by a fuel supply pipe 96 to the outlet side of a fuel injection control valve 98, the inlet side of which is connected by a pipe 100 to a source of jet engine fuel, ordinarily a liquid hydro-carbon. The valve 98 is mounted on an upstanding base 102 secured to the entrance portion 29 of the housing forward wall 28 and has a movable valve member 104 actuated by a crank arm 106 pivotally connected by a rod 108 to a control lever (not shown) or other suitable control member.

The forward end of the shaft 36 is provided with a round-nosed shield 110 (FIGURE 1). The intermediate wall 62 of the rotor 24 is drilled at circumferentially-spaced intervals spaced inwardly from the forward end 86 and near the inlets 84 of the blade channels 72 of the rotor 24 and remote from the outlets 82 of the blade channels 72 to receive conventional igniters 112, such as spark plugs, wired or otherwise electrically connected by conductors 113 to circumferentially-spaced brushes 114 passing through insulating bushings 116 in the rearward rotor wall 64. The brushes 114 in turn slidably engage an annular slip ring 118 insulatedly mounted on the insulating ring 120 (FIGURE 1). Electrical contact with the slip ring 118 is made by means of a conductor 122 passing through an insulating bushing 124 mounted in the rearward housing structure wall 42 adjacent the shaft bearing 38. The conductor 122 is connected to an external source of high tension electricity by an external connector 126 bolted thereto as at 128.

In the operation of the gas turbine engine 20 of FIGURES 1 to 3 inclusive, liquid fuel is supplied to the fuel manifold 92 through the pipes 100, 96 and 94 and the control valve 98 which is of course opened in order to permit fuel to be injected from the nozzles 90 into the rotor fuel injection passageway 88 as a fine spray. Meanwhile, the rotor 24 is rotated by a conventional starter applied to the shaft 36 and the igniters 112 are at the same time supplied with high tension electricity from the external source mentioned above, such as a spark coil or magneto, to cause ignition sparks to jump across the spark gaps in the igniters 112.

As a result of these simultaneous actions, and by reason of rotation of the rotor 24 by the starter engaging the shaft 36 the resulting centrifugal force acting upon the air molecules causes partial compression of air within the rotor blade channels 72, and also causes this air to be forced outwardly through the blade channels 72, at the same time being mixed with the fuel sprayed into the air stream by the nozzles 90. The venturi effect at the rotor inlet passageway 88 and the evaporation of the fuel cools the fuel-air mixture. The ignition of the fuel-air mixture by the spark from the igniters 112 inlets 84 causes combustion to take place within the blade channels 72 substantially throughout the major portions of the lengths thereof as the gases are expelled approximately radially through the blade channels 72 by the compressor action of the rotor 24 as the gases traverse the radial portions 74 of the blade channels 72. When the gases pass the corners or junctions 78 (FIGURE 3) and enter the approximately tangential passageways 76, they impart torque to the blades 68 and 70, thereby imparting rotation to the rotor shaft 36 and thence to the power transmission mechanism leading to the load, such as an aircraft propeller, vehicle wheel or marine propeller. The burnt gases are discharged through the exhaust ports or outlets 82 into the annular exhaust manifold 26 and thence outward through the exhaust ports 50 into the exhaust pipes 52 and thence to the atmosphere.

During such operation, the temperature increase and higher densities of the fuel-air mixture imparted by compression thereof by the rotor 24 reduces the time of combustion; at sufficiently high rotational speeds the compression ratio may be made sufficiently high to cause direct ignition of the fuel without the necessity for externally-excited igniters, hence in such instance the igniters 112 can be rendered inactive, and used only for the period of starting and coming up to operating speed. The burning gases within the blade channels 72 reach their hottest temperatures when they arrive in the approximately tangential passageways 76 beyond the corners 78, and because of the action of the centrifugal force from the spinning rotor 24 and the heating effect of combustion, escape through the exhaust ports 82 in a high speed jet stream approximately tangential to the rotor 24. The outlet or exhaust ports 82 are so designed that only enough radial component of jet velocity is obtained to move the gases away from the periphery of the rotor 24 to the exhaust outlets 50, the jet reaction from the tangential component of the burning gases producing the driving torque which rotates the rotor 24 to subsequently perform its own compressing as well as to apply power to the shaft 36. As a result of this construction, the engine 20 possesses a much more compact construction than prior gas turbine engines, with much lighter weight and a shorter shaft, as well as the other advantages set forth heretofore in the foregoing objects of the invention.

The modified gas turbine engine, generally designated 130, shown in part in FIGURE 4 is intended to replace the rotor 24 in the gas turbine engine 20 of FIGURE 1 to which it is otherwise generally similar. The engine 130, however, has a rotor 132 with a disc-shaped rear wall 133 and a hollow hub 134 apertured at circumferentially-spaced intervals to communicate with the inner ends of approximately L-shaped tubular blades 136 separated from one another by radial air spaces 137. The tubular blades 136 have radial portions 138 and approximately tangential portions 140 joined to one another at approximate corners 142. The rotor 132 as before has a central hub 144 keyed or otherwise secured as at 146 to the shaft 36 and thereby providing an annular air intake and fuel injection passageway 148 similar to the passageway 88 of FIGURE 1 and similarly provided with fuel injection nozzles 90 (not shown). The blade channels 150 of the tubular blades 136 thus have approximately radial and approximately tangential passageways 152 and 154 respectively, the latter imparting a torque to the rotor shaft 36 by the jet thrust of the burning gases passing therethrough as explained above in connection with the description of the operation of the gas turbine engine 20. In other respects the operation of the gas turbine engine equipped with the rotor 132 of FIGURE 4 is substantially the same as that of the gas turbine engine 20 equipped with the rotor 24 except that the tubular blades 136 are more easily cooled by reason of their separation from one another by air spaces.

The modified gas turbine engine, generally designated 160, shown in FIGURES 5 to 7 inclusive is essentially an amplification of the turbine engine of FIGURES 1 to 3 inclusive to the left of the section line 7—7 therein, hence similar parts are designated with the same reference numerals as in FIGURE 1. The modified gas turbine engine 160 adds to the gas turbine engine 20 a peripheral axial-flow assembly, generally designated 162, consisting of circumferentially-spaced angled guide blades 164 which direct the burning gases from the annular exhaust manifold 166 into circumferentially-spaced angled blades 168 mounted on the peripheral axial extension 170 of the rotor rearward wall 64, so as to impart additional thrust thereto and additional torque to the shaft 36. In order to support the exhaust duct structure 172, however, the hub 174 constituting the rearward shaft bearing for the shaft 36 carries a radially-extending structure 176 upon the periphery of which is mounted an annular inner wall 178 connected to the annular outer wall 180 by struts 182, preferably of air foil cross-section (FIGURE 6). The forward shaft bearing for the shaft 36 is omitted from FIGURE 5 to conserve space but is like the forward shaft bearing 32 of the similarly numbered shaft 36 in FIGURE 1.

The operation of the modified gas turbine engine 160 is substantially identical with that of FIGURE 1 as regards the radial rotor stage 24 thereof, but the gases discharged therefrom into the annular exhaust manifold 166, instead of being discharged directly into the exhaust conduits 52, are deflected by the guide blades 164 against the turbine blades 168 before they pass into the exhaust duct structure 172 and thence into the exhaust conduits (not shown) or directly into the open air as the installation conditions permit. In this manner, an increased torque is imparted by the axial-flow blades 168 to the rotor 24 through its extension 170 and consequently a greater power output is obtained from the rotor shaft 36.

The further modified gas turbine engine, generally designated 190, shown in FIGURES 8 and 9 differs from the engine 20 of FIGURES 1 to 3 inclusive by providing an adjustable rotor, generally designated 192, having blade channels 194 which are generally similar in configuration to the blade channels 72 of FIGURE 3, but which are adjustable to variable cross-sectional areas by the separation of the rotor 192 into axially relatively movable forward and rearward rotor halves 196 and 198 respectively. The rotor half 196 also is provided with a cooling and air counterflow arrangement, generally designated 200, described in more detail below.

The rotor 192 is housed in a housing structure, generally designated 202, consisting of an annular peripheral front housing half 204 and generally radial rearward housing half 206 carrying a shaft bearing 208 for a power output shaft 210. The rearward rotor half 198 is keyed or otherwise drivingly secured as at 212 to the shaft 210 for occupying a fixed position thereon, whereas the forward rotor half 196 is keyed, splined or otherwise drivingly and axially slidingly connected to the shaft 210 as at 214 by means of an elongated hub 216 connected to the hollow approximately cylindrical intake portion 218 of the rotor half 196 by spider arms or struts 220. The forward rotor half 196 is provided with inverted L-shaped blade halves 222 of approximately U-shaped cross-section containing correspondingly-shaped troughs 224 into which rearward blade halves 226 enter for axial sliding motion and sealing action. The rotor blades, generally designated 228, consist collectively of the blade halves 222 and 226 (FIGURE 9). In order to cool the forward rotor half 196 and provide an air counterflow which inhibits gas leakage, the rotor half 196 is provided with radially-spaced axial flanges 230 and 232 separated from one another by three oppositely-facing and interfitting axial flanges 234, 236 and 238 secured to an annular radial wall 240, such as by being cast integrally therewith as a part of the forward casing half 204. Struts 242 connect this structure with the central forward shaft bearing 244 which rotatably supports the forward end of the power output shaft 210. The rotor flanges 230 and 232 are each provided with oppositely-facing circumferentially-spaced fan blades 246 and 248 respectively which, as stated in connection with the operation of the invention, cause a flow of cooling air in response to the rotation of the rotor 192.

The outer end of the rearward rotor half 198 is provided with a forwardly-extending peripheral sealing flange 250 which interfits between inner and outer annular housing flanges 252 and 254 projecting rearwardly from the forward housing half 204 immediately adjacent the cooling and air counterflow arrangement 200. By this construction, the forward rotor half 196 can be slid forwardly along the shaft 210 (to the right in FIGURE 8) while its periphery 256 maintains a sealing relationship with the peripheral flange 250 on the rearward rotor half 198. As in the engine 20 of FIGURE 1, the peripherally-flanged forward housing half 204 of the engine 190 is bolted or otherwise connected to an axially-offset extension 258 of the rearward rotor half 206, the latter having elongated exhaust ports 260 and also having elongated flanged exhaust conduit 262 similar to the construction shown at the top and bottom of FIGURE 1.

The forward rotor half 196 is moved axially to and fro relatively to the rearward half 198 of the rotor 192 by means of an integral shift collar portion 264 containing an annular groove 266 engaged by the diametrically-opposite radially-inwardly projecting shift pins 268 on the yoke portion 270 of a shift lever 272 to the lower end of which is pivotally connected a shift rod 274 leading to a hand lever or other suitable shift control member (not shown). Pivotally connected to the upper end of the shift lever 272, which is pivotally mounted at 276 upon a strut 278 projecting axially from one of the spiders 242 is a link 280 which in turn is pivotally connected to the operating arm 282 of the rotary valve member 284 of a fuel injection control valve 286 mounted on a base 288 secured to the struts 242. The valve 286 is supplied with fuel, such as a liquid hydro-carbon, through a fuel supply pipe 290 and discharges the fuel thus supplied through a pipe 292 leading to an annular fuel intake manifold 294 from which L-shaped fuel injection nozzles 295 project inwardly into the rotor inlet passageway 296. A coil compression spring 297 surrounding the shaft 210 urges the forward rotor half hub 216 to the right or rearwardly and abuts a thrust collar 298 pinned or otherwise secured to the shaft 210. As stated above in the brief description of the drawings, the ignition arrangement which is substantially the same as that shown at 112 to 128 in FIGURE 1, has been omitted from FIGURE 8 to simplify the drawing.

The operation of the gas turbine engine 190 with adjustable blade channel cross-section for a given position of adjustment of the rotor halves 196 and 198 is generally similar to that of the engine 20 of FIGURE 1 described above, including the ignition of the fuel-air mixture, except that the rotation of the rotor 192 made up of the rotor halves 196 and 198 causes consequent rotation of the annular rows of fan blades 246 and 248 on the annular flanges 230 and 232 of the rotor half 196, causing cooling air to circulate through the air spaces within the annular cooling arrangement 200. If, however, the operator wishes to change the power output of the engine 190, he shifts the rod 274 to swing the lever 272 in one direction or the other to shift the hub 216 and rotor half 196 axially to the right so as to move the rotor halves 196 and 198 closer together for a reduced power output or farther apart for an increased power output. For example, where the engine 190 is installed in a vehicle, the conditions of operation of which require reduction of power while driving in traffic, the operator pushes on the rod 274 to move the movable rotor half 196 toward the fixed rotor half 198 and consequently reduce the cross-sectional area of the blade channels 194. This consequently reduces the mass flow of air and fuel gas mixture through the blade channels 194 while at the same time the connection of the valve member 284 through the crank arm 282 and link 280 to the lever 270 reduces the delivery of fuel through the nozzles 295 into the rotor inlet passageway 296 to accord with the reduced flow of air resulting from the reduction in the compressing function of the rotor 192.

As a result, the reduced mass flow of fuel-and-air mixture and the thrust of the burning gases emerging tangentially from the inverted L-shaped blade assemblies 228 impart reduced torque to the shaft 210 and consequently a reduced power output of the engine 190. Since, however, less volume of air is meanwhile required to be handled by the rotor 192 in performing its compressing function at reduced rotor half separation, less power is consumed in rotating the rotor 192 to perform the compressing function, hence the rotor 192 is maintained at nearly the same speed of rotation as when it was delivering its maximum power output at maximum cross-sectional blade channel area. The back pressure in the blade channels 194 set up by the outer bent portions thereof maintains a relatively high pressure within the blade channels 194 and consequently maintains the compression ratio within the lower or compressing portions of the blade channels 194 at a nearly constant figure even though the power output has been reduced as a result of the reduction of fuel and air mixture passing through and burning within the blade channels 194. For these reasons, the specific fuel consumption of the gas turbine engine 190 is greatly reduced and its operating efficiency maintained at a correspondingly high figure even at reduced power output from the shaft 210.

The still further modified gas turbine engine, generally designated 300, shown in FIGURES 10 and 11 also employs the rotor 192 of the engine 190 of FIGURE 8 with its relatively movable rotor halves 196 and 198 and the shifting mechanism 272, 274 and coupled fuel injection control valve 286, together with an ignition arrangement, generally designated 301, similar to that shown at 112 to 128 in FIGURE 1, and described more fully below, using similar reference numerals. The engine 300, however, omits the cooling arrangement 200 and adds a supplemental closure device, generally designated 302, to the left or front of the rotor 192 and also adds a supplementary axial flow turbine unit, generally designated 304 at the rear of the rotor 192 at the right-hand end of FIGURE 10. Due to the interposition of the turbine unit 304, the ignition 112 of FIGURE 1, when applied to the engine 300 of FIGURE 10 are supplied with ignition electricity through conductors 113 passing through insulating bushings 303 mounted in the rear wall of the rearward rotor half 198 to the brushes 114 mounted in the insulating bushings 116 in the turbine rotor 336 and engaging the slip ring 118 mounted on the insulating ring 120 on the rear casing wall 340 as in FIGURE 1, the conductor 122 in the insulating bushing 124 leading, as in FIGURE 1, to the external connector 126 bolted thereto at 128, as also in FIGURE 1.

The closure device 302 consists of a supporting disc 306 mounted in an annular groove 308 within the hub 216 so as to permit the latter to rotate relatively to the supporting disc 306. Holes 310 are provided in the supporting disc 306 for the passage of the fuel injection nozzles 295. A bell-shaped wall 312 extends rearwardly and outwardly from the supporting disc 306 and its radially-directed periphery 314 is connected to the rearward end 316 of an annular accordion bellows 318, the forward end 320 of which is flanged and is secured to the inner surface of the housing 322. The latter is of approximately cylindrical annular shape and has an inwardly-directed intermediate portion 324 which at the annular line of junction 326 joins a rearwardly and outwardly flared exhaust portion 328.

The rearward or fixed rotor half 198 as before has a forwardly projecting annular peripheral sealing wall 250 but its cooperating sealing members 252 and 254, instead of being secured to the housing 204 as in FIGURE 8, are secured to the periphery of the adjustable rotor half 196 so as to seal the periphery of the rotor 192 while moving its half 196 axially relatively to the rotor half 198. Nozzles 330 are provided at intervals around the periphery of the rotor half 198 corresponding to the locations of the outer ends of the blade channels 194 (FIGURE 11), these being directed obliquely to a plane perpendicular to the axis of rotation of the shaft 210 so as to direct the burning gases obliquely into the blade channels 332 between the peripheral blades 334 of an axial flow turbine rotor 336, the hub of which is keyed or otherwise drivingly secured at 338 to the shaft 210. A disc-shaped supporting wall 340 provides a central bearing 342 for rotatably supporting the rearward end of the shaft 210 and extends outward to a flared annular wall 344 connected to the outwardly-flared exhaust portion 328 of the casing 320 by peripherally-spaced struts 346 preferably of air foil cross-section.

The operation of the gas turbine engine 300 of FIGURE 10 is generally so similar to that of the engine 190 of FIGURE 8 as to require no repetition of description. As the burning gases, ignited in the blade channels 194, emerge through the oblique peripheral nozzles 330, they are directed obliquely into the axial-flow blade channels 332 between the turbine rotor blades 330. The thrust action from the nozzles 330 and the adjoining blade channels 194 imparts a torque to the shaft 210, whereas the thrust action against the turbine rotor blades 334 imparts an additional torque to the turbine rotor 336, increasing the power output of the engine 300 over that of the engine 190 of FIGURE 8. The exhaust gases flow outward past the struts 346 through the exhaust passageway 248 thence to the atmosphere. Adjustment of the rotor half 196 relatively to the rotor half 198 takes place in exactly the same way as described above in connection with the operation of the engine 190 of FIGURE 8, together with a similar corresponding control of the fuel injection by the fuel injection control valve 286. Meanwhile, supplemental closure device 302 maintains the forward end of the engine housing 320 closed while shifting axially to and fro as the hub 216 is shifted by the control rod 274 and arm 272 of the shift lever 270, the bellows 318 expanding and contracting as this action occurs.

The modified gas turbine engine, generally designated 350 shown in FIGURE 12 is generally similar in construction to the engine 20 of FIGURES 1 to 3 inclusive and employs similar L-shaped blades and blade channels as shown in FIGURE 3. The ignition arrangement, omitted from FIGURE 12, to simplify the drawing, is also the same as that shown at 144 to 128 in FIGURE 2.

The modified engine 350 is chiefly distinguished from the foregoing forms of the invention by having a rotor, generally designated 352, provided with multiple axially-spaced tandem conical partitions 354, 356, 358 and 360 between which extend multiple tandem blades 362, 364, 366 and 368 respectively providing blade channels therebetween. As previously stated, the blades 362, 364, 366 and 368 are of the same cross-sectional configuration as the blades 68 and 70 of the engine 20 of FIGURE 3, in that they are of inverted L-shaped form providing peripheral jet thrust action as in the engine 20 of FIGURE 3. The inner circular edges of the blades 362 to 368 are spaced radially away from the hub 370 of the rotor 352 so as to provide an annular inlet passageway 372, the rotor 352 having an outwardly and rearwardly inclined web 374 of approximately triangular cross-section integral with the hub 370. The hub 370 is keyed or otherwise secured as at 376 to an output shaft 378, the rearward end of which is journaled in a central shaft bearing portion 380 in the approximately radial rearward housing half 382.

The blades 362 to 368 and the conical partitions 354 to 360 are inclined outwardly and rearwardly in a manner similar to the rotor web 374, and the forward casing half 384 has a similarly flared forward wall 386 together with a hollow cylindrical forwardly-projecting axial portion 388 having a cylindrical bore 390 therein. Slidably mounted in the bore 390 is a hollow blade channel cutoff sleeve 392 which is axially slidable into and out of the inlet passageway 372 past the inner edges of the conical partitions 354 to 360 to cut off the blade channels of the blades 362 to 368 selectively and sequentially, as described below in connection with the operation of the invention. This shifting is accomplished by means of a shift rod 394 connected to the boss 396 on the inner side of the sleeve 392. Fuel injection is accomplished by circumferentially-spaced parallel nozzles 398 mounted on radial spokes 406 projecting radially from a central shaft bearing 402 which is bored to rotatably support the forward end of the shaft 378 and has a rounded nose portion 404 which in turn is supported by radial struts or spokes 406 leading to the cylindrical housing portion 388.

The operation of the engine 350 of FIGURE 12 is also generally similar to that of the engine 20 of FIIGURE 1, as regards fuel injection, ignition and combustion. Combustion, however, takes place simultaneously within the multiple tandem channels of the blades 362, 364, 366 and 368 and these can be shut off one by one by shifting the control rod 394 and sleeve 392 so as to reduce the power output of the engine 350, the spray of fuel from the nozzles 398 being correspondingly reduced at the same time.

The modified gas turbine engine, generally designated 410, shown in FIGURES 13 to 15 inclusive is generally similar to the engine 350 of FIGURE 12, but employs a different arrangement for sequentially and individually shutting off the blade channels. In particular, the engine 410 is contained within a housing 412 composed of forward and rearward halves 414 and 416, the latter being in the form of a substantially radial disc with discharge ports 418 therein leading to exhaust conduits 420 bolted or otherwise secured thereto.

The forward housing half 414 is composed of a substantially hollow cylindrical forward portion 422, a substantially conical portion 424 extending outwardly and rearwardly therefrom and a flared peripheral portion 426 which is flanged for bolting to the flanged periphery of the rearward housing half 416. The latter is provided with a rearward central shaft bearing portion 428 and the forward housing half portion 422 is provided with a forward central shaft bearing portion 429 in which a power output shaft 430 is rotatably mounted. Keyed or otherwise drivingly secured at 432 to the shaft 430 is a multiple tandem blade rotor, generally designated 434, having a radial web 436 of approximately triangular cross-section joined to a forwardly-extending hub 438.

Secured to and preferably integral with the web 436 are axially-spaced conical partitions 440, 442, 444 and 446 between which extend inverted L-shaped multiple blades 448, 450, 452 and 454, the outer portions of which are shaped similarly to those shown at 68 and 70 in FIGURE 3, in that their peripheral ends are bent approximately tangentially to the rotor as a whole. The inner ends of the blades 448 to 454 are bent axially in a forward direction parallel to the axis of the shaft 430 to provide axial entrance ports 456, 458, 460 and 462 respectively disposed parallel to the axis of the shaft 430.

The outermost ports 456 to 460, inclusive, of the blade channels 448 to 452 are closed individually by semi-circular concentric valve members 464, 466 and 468, FIG. 14, of similar construction but facing in opposite directions hence only a single set of these semi-circular or arcuate valve members is shown in FIGURE 14, together with the upper ends of the cooperating set thereof. Each of the valve members 464, 466 and 468 is provided with one or more operating arms 470, 472 or 474 (FIGURE 14) pivotally mounted on a pivot shaft 476 supported in laterally-spaced brackets 478 extending upwardly from the forward central housing portion 422. Mounted rearwardly of the arms 470, 472 and 474 are fuel injection nozzles 480, 482 and 484, each being controlled by a valve 486, 488 or 490 which is in turn piped into a fuel supply manifold 492. The valves 486 to 490 have valve operating cranks 487, 489 and 491 controlled by arms 492, 494 and 496 respectively integral with and extending oppositely from the arms 474, 472 and 470 which carry the semi-circular valve members 468, 466 and 464 respectively. The central unvalved set of ports 462 for the innermost blade channels 454 receives fuel from a nozzle 498 connected to a valve 500 which is likewise piped into the manifold 402 and is controlled by an arm to which is connected a control rod 504 (FIGURE 13).

Pivotally connected to each of the semi-circular valve members 464, 466 and 468 is a control rod 506, 508 and 510 respectively (FIGURE 15). The control rods 506, 508 and 510 are of different lengths and carry heads 512, 514 and 516 respectively on their outer or forward ends. Each of the rods 506, 508 and 510 carries a compression spring 518 and collar 520 by which it normally urges its respective semi-circular valve member 464, 466 or 468 toward its closed position shown in FIGURES 14 to 16 inclusive. The valve operating rods 506, 508 and 510 are slidably mounted in a laterally-projecting portion 522 of a bracket 524 (FIGURE 15) which extends forwardly from the housing half 414 at the central portion thereof. Contact with each of the heads 512, 514 and 516 is made sequentially by means of a cross bar 526 secured to a control rod 528 through the intermediate L-shaped connecting portion 530 (FIGURE 13) extending to one side of the heads 512, 514 and 516. Each of the control rods 528, of which there are two corresponding to the two sets of arcuate or semi-circular valve members 464, 466 and 468 is slidably mounted in a bearing boss 532 on a forward offset extension 534 of the bracket 524.

The operation of the modified gas turbine engine 410 is generally similar in principle to that of the engine 350 of FIGURE 12 except that the entrance ports 456, 458, 460 and 462 of the blades 448, 450, 452 and 454 respectively are uncovered in sequence in a radial direction rather than in an axial direction as in FIGURE 12, in order to reduce or increase the power output of the engine. This the operator accomplishes by pulling on the rods 528 through a suitable control lever or the like (not shown), thereby causing the cross bar 526 first to exert a pull on the heads 516 of the rods 510, shifting the innermost valve members 468 forwardly to uncover the innermost valved blade channel ports 460. The same action swings the arm 474 on the cross shaft 476, consequently swinging the arm 492 and valve crank 487 to open the fuel injection control valve 486 and supply fuel to the innermost nozzle. It will be evident that a pin and slot connection or other means of compensating for change in radius of engagement between the arms 491 and 496 and between the remaining arms 489 and 494 and also 487 and 492 will be provided in practice, but has been omitted from the drawings to avoid unduly complicating them.

As the operator continues to exert a further pull on the rods 528, the cross bar 526 moves further forward into engagement with the heads 514 on the rods 508, at the same time maintaining its engagement with the heads 516 on the rods 510. As a consequence and in a similar manner to that described immediately above, the intermediate valve members 466 will be swung open, at the same time opening their respective fuel injection control valves 488 to supply fuel to their nozzles 482, thus injecting fuel into the now open intermediate blade channel ports 458. Further forward movement (to the left in FIGURE 15) of the control rod 528 maintains engagement between the cross bar 526 and the heads 516 and 514 on the rods 510 and 508 while it moves into engagement with the head 512 on the rod 506, shifting the outermost arcuate or semi-circular valve members 464 to their open positions. This action rotates the cross shaft 476 through its pinned connection with the arms 470, swinging the arm 496 and the crank arm 491 of the valve 490, opening the latter so as to discharge fuel through the outermost spray nozzle 482. Meanwhile, fuel has been continuously sprayed through the innermost nozzle 498 into the channels of the innermost blades 454, causing constant combustion to take place within the blade channels of the blades 454 while intermittent combustion takes place in the blade channels of the blades 452, 450 and 448, depending upon whether or not they are covered or uncovered by their respective valve members 468, 466 or 464 respectively. The remainder of the operation is similar to that described in connection with FIGURE 12 and requires no repetition at this point.

The modified rotor, generally designated 540, shown in FIGURE 16 is intended to be substituted for the rotor 434 of FIGURE 13, the engine being otherwise the same both in construction and operation. The rotor 540 is similarly keyed as at 542 to the shaft 430 but differs from the rotor 434 by having hollow blades 544, 546, 548 and 550 arranged in tandem axially on the shaft 430 and separated from one another by cooling air spaces 552, 554 and 556 through which cooling air is circulated by the rotary pumping action of the rotor during its rotation. The rotor 540, like the rotor 434, has a supporting web 558 of approximately triangular cross-section which, as previously stated, is keyed at 542 to the shaft 430. Fuel injection and control of the valve members for valving the intake ports 560, 562, 564 and 566 of the blade channels 568, 570, 572 and 574 is accomplished by mechanical arrangements similar to those shown and described in connection with the engine 410 of FIGURES 13 to 15 inclusive.

The operation of the engine 410 of FIGURES 13 to 15 inclusive, when equipped with the modified rotor 540, is also the same as that described above with the exception of the fact that the flow of air through the air spaces 552, 554 and 556 between the hollow axially-spaced blades 544, 546, 548 and 550 assists in cooling the blades during operation.

The modified gas turbine engine, generally designated 600, shown in FIGURE 17 applies the principles of the invention to a wholly axial flow engine wherein combustion takes place within the axial flow rotor unit 602, which also acts in part as a turbine or propelling unit, and transmits the exhaust gases to a turbine unit 604. The engine 600 is provided with an elongated housing 606 having its minimum diameter at its central portion 608 and slightly bell-mouthed or flared entrance and exit portions 610 and 612 respectively. The housing 606 at one end is provided with radial arms 614 supporting a central shaft bearing 616 in which is rotatably supported one end of a power output shaft 618, the opposite end of which is supported by a central shaft bearing 620 connected by radial arms 622 to an annular inner wall 624 of arcuate cross-section which is connected by struts 626 to the outwardly-flared discharge or exhaust wall portion 628 at the extreme rearward end of the casing 606 and crossing the exhaust outlet space 629 between the wall portions 624 and 628. As before, the struts 626 are preferably of air foil cross-section to offer the minimum resistance to the flow of the exhaust gases.

Keyed or otherwise drivingly connected to the shaft 618 at spaced locations 630 and 632 respectively (FIGURE 17) are the hubs 633 and 635 of the opposite end spokes 634 and 636 of an elongated barrel-shaped rotor shell 638 of a rotor, generally designated 640. The rotor shell 638 has its central maximum diameter portion 642 disposed opposite the minimum diameter portion 608 of the housing 606 and has converging or tapered forward and rearward portions 644 and 646 respectively disposed opposite the portions 610 and 612 of the housing 606. In this manner, there is provided between the housing 606 and rotor shell 638 (both of which are hollow bodies of revolution, to use a geometrical term) a rearwardly converging annular compression and combustion space 648 and a rearwardly-diverging turbine space 650, and between them a substantially uniform-width passageway forming a combustion chamber 652.

Secured at one end each to the converging housing wall portion 610 and rotor shell portion 644 respectively are stationary guide blades 654 and rotary blades 656, the former being spaced apart from one another to receive the latter between them. As in the case of the previous forms of the invention, the blades 654 and 656 are arranged oblique to the axis of rotation of the shaft 618 similarly to those shown in FIGURES 6 and 11, hence it is believed a further illustration thereof is unnecessary. In a similar manner, arranged between the rearwardly-diverging housing and rotor shell walls 612 and 646 respectively and secured alternately thereto are stationary guide blades 658 interspersed with movable turbine blades 660. The guide blades 658 are secured at their outer ends of the housing wall portion 612 and the turbine blades 660 are secured at their inner ends to the rotor shell portion 646.

To supply fuel to the engine 600, a spray nozzle 662 or a series of such nozzles is arranged at or near the forward end of the housing 606 and connected to a fuel supply pipe 664 leading to a source of liquid fuel under pressure. The first and second rows of blades containing the guide blades 654 and 656 are spaced slightly farther apart from one another as at 666 to provide space for an igniter or igniters 668, such as a conventional spark plug connected to a high tension source of electricity.

In the slightly modified engine, generally designated 670, shown in FIGURE 18, the nozzle 662 is moved into a space 672 intermediate the opposite ends of the blading 654, 656 to inject fuel after a certain amount of air compression has taken place, and the igniter 668 is correspondingly arranged in a similar interblade space 674 beyond the fuel injection nozzle 662. The construction of the engine 670 is otherwise substantially identical with that of the engine 600 and, like it, is constructed and arranged to retard combustion until the fuel-air mixture reaches the combustion chamber 652.

In the operation of the gas turbine engine 600, the rotor 640 is rotated by a starter connected to the shaft 618 while at the same time fuel under pressure is supplied to the nozzle 662 and high tension electricity to the igniter 668. The rotation of the blades 656 on the rotor shell 638 compresses the air entering from the left into the converging space 648, the compression being furthered by the convergence of this space toward the right, the air emerging from the rotating blades 656 being redirected by the intervening guide blades 654. Meanwhile, the fuel sprayed from the nozzle or nozzles 652 mixes with the entering air and is ignited by the igniter 668 and starts to burn, but does not completely burn as it makes it way through the converging space 648. Substantially complete combustion of the gaseous mixture takes place as it traverses the uniform-width space forming the combustion chamber 652. Beyond this, the gaseous products of combustion enter the diverging turbine space 650 and are guided by the guide blades 658 against the turbine blades 660, imparting a torque to the rotor shell 638 and consequently to the shaft 618, and moving the load connected thereto. The exhaust gases, after passing between the turbine guide blades 658 and rotor blades 660 pass outward through the exhaust outlet space 629 into the atmosphere.

The operation of the slight modification of the motor 600 constituted by the motor 670 of FIGURE 18 is similar to that described above in most respects, except that certain of the rotor blades 656 and guide blades 654 are located ahead of the injection nozzle or nozzles 662, and igniter or igniters 668, and greater compression of the incoming air occurs before fuel injection and ignition than in the engine 600 of FIGURE 17. Combustion, however, starts as before within the combustion chamber 652, and the exhaust gases impart torque to the rotor shell 638 by the action of the exhaust gases upon the turbine blades 660 in the turbine space 650 of the turbine unit 604, as explained above.

The slightly modified rotor, generally designated 680, shown in FIGURE 19, on sheet one, has outwardly-directed generally spiral blades 682 spaced circumferentially apart from one another to provide diverging spiral blade channels 684, the inner ends of which are spaced apart from the shaft 686 keyed or otherwise secured at 688 to the web or blade supporting disc 690 so as to provide annular space 692 around the shaft 686 for fuel injection, as explained above in connection with the engine 20 of FIGURE 1. The rotor 680, however, lacking the abrutly directed tangential portions of the inverted L-shaped blades 68 and 70 of FIGURE 3, consequently lacks the same tangential thrust action as the blades 68 and 70.

What I claim is:

1. A gas turbine engine comprising a housing structure containing a rotor chamber, a rotor shaft rotatably mounted in said housing structure, a rotor rotatably mounted within said rotor chamber in driving connection with said shaft and having gas-compressing blades with blade channels including inlets and outlets, a fuel injector mounted in said housing structure in fuel-injecting relationship to the inlets of said blade channels, and a fuel igniter positioned in the fuel discharge path from said injector, said igniter being disposed within said blade channels between said inlets and said outlets for igniting the fuel from said injector to burn within said blade channels between said inlets and said outlets of said blade channels.

2. A gas turbine engine, comprising a hollow housing structure containing a rotor chamber, a rotor shaft rotatably mounted in said housing structure, a rotor rotatably mounted within said rotor chamber in driving connection with said shaft and having gas-compressing blades with blade channels, a fuel injector mounted in said housing structure in fuel-injecting relationship to said blade channels, and a fuel igniter positioned in the fuel discharge path from said injector for igniting the fuel therefrom to burn within said blade channels, said rotor being composed of two axially-relatively-movable halves having blades arranged in overlapping relationship and means for moving one of the halves relatively to the other half for varying the cross-sectional area of the blade channels between the blades.

3. A gas turbine engine, according to claim 2, wherein there is provided a fuel injection control valve connected to the injector and operatively connected to the rotor half moving means for actuation in response to the motion of the movable rotor half.

4. A gas turbine engine, according to claim 2, wherein the casing structure and the axially-movable rotor half have annular walls disposed adjacent one another in overlapping spaced relationship and wherein air-moving vanes are disposed on at least one of said walls and positioned to effect forced flow of air into said casing structure to retard gas leakage therefrom.

5. A gas turbine engine, according to claim 2, wherein an axial-flow turbine rotor is disposed adjacent the first-mentioned rotor in driving connection with the shaft and has blades thereon with axially-directed blade channels therebetween communicating with the outlets of the first-mentioned blade channels.

6. A gas turbine engine, comprising a hollow housing structure containing a rotor chamber, a rotor shaft rotatably mounted in said housing structure, a rotor rotatably mounted within said rotor chamber in driving connection with said shaft and having gas-compressing blades with blade channels, a fuel injector mounted in said housing structure in fuel-injecting relationship to said blade channels, and a fuel igniter positioned in the fuel discharge path from said injector for igniting the fuel therefrom to burn within said blade channels, said rotor having a plurality of sets of such blades disposed in tandem relatively to one another lengthwise of said shaft.

7. A gas turbine engine, according to claim 6, wherein the tandem sets of blades are spaced axially apart from one another with cooling spaces therebetween.

8. A gas turbine engine, according to claim 6, wherein the inner ends of the blades and the inlets to the blade channels of the sets of blades are spaced outwardly away from the shaft and wherein a valve member is mounted for axial motion into the space between the shaft and blade channel inlets into selectively operable closing and opening relationship with said inlets.

9. A gas turbine engine, according to claim 6, wherein the inner ends of the blades and the blade channels therebetween of the sets of blades are disposed substantially parallel to the axis of rotation of the shaft and wherein valve members are movably mounted adjacent the blade channel inlets of the last-mentioned blades for motion into and out of closing relationship therewith.

References Cited in the file of this patent

UNITED STATES PATENTS

| | | |
|---|---|---|
| 762,175 | Lees | June 7, 1904 |
| 1,279,128 | Lake | Sept. 17, 1918 |
| 2,272,676 | Leduc | Feb. 10, 1942 |
| 2,514,874 | Kollsman | July 11, 1950 |
| 2,594,629 | Exner | Apr. 29, 1952 |
| 2,630,678 | Pratt | Mar. 10, 1953 |
| 2,709,889 | Mount | June 7, 1955 |
| 2,928,239 | Goldstein | Mar. 15, 1960 |

FOREIGN PATENTS

| | | |
|---|---|---|
| 934,755 | France | Jan. 19, 1948 |
| 499,357 | Great Britain | Jan. 23, 1939 |
| 598,774 | Great Britain | Feb. 26, 1948 |
| 438,260 | Italy | Aug. 3, 1948 |